Aug. 10, 1954  S. W. POLLOCK  2,685,708
MOLDING METHOD
Filed Jan. 29, 1951  9 Sheets-Sheet 3

INVENTOR
S. Wilson Pollock
BY
Curtis, Morris + Safford
ATTORNEYS

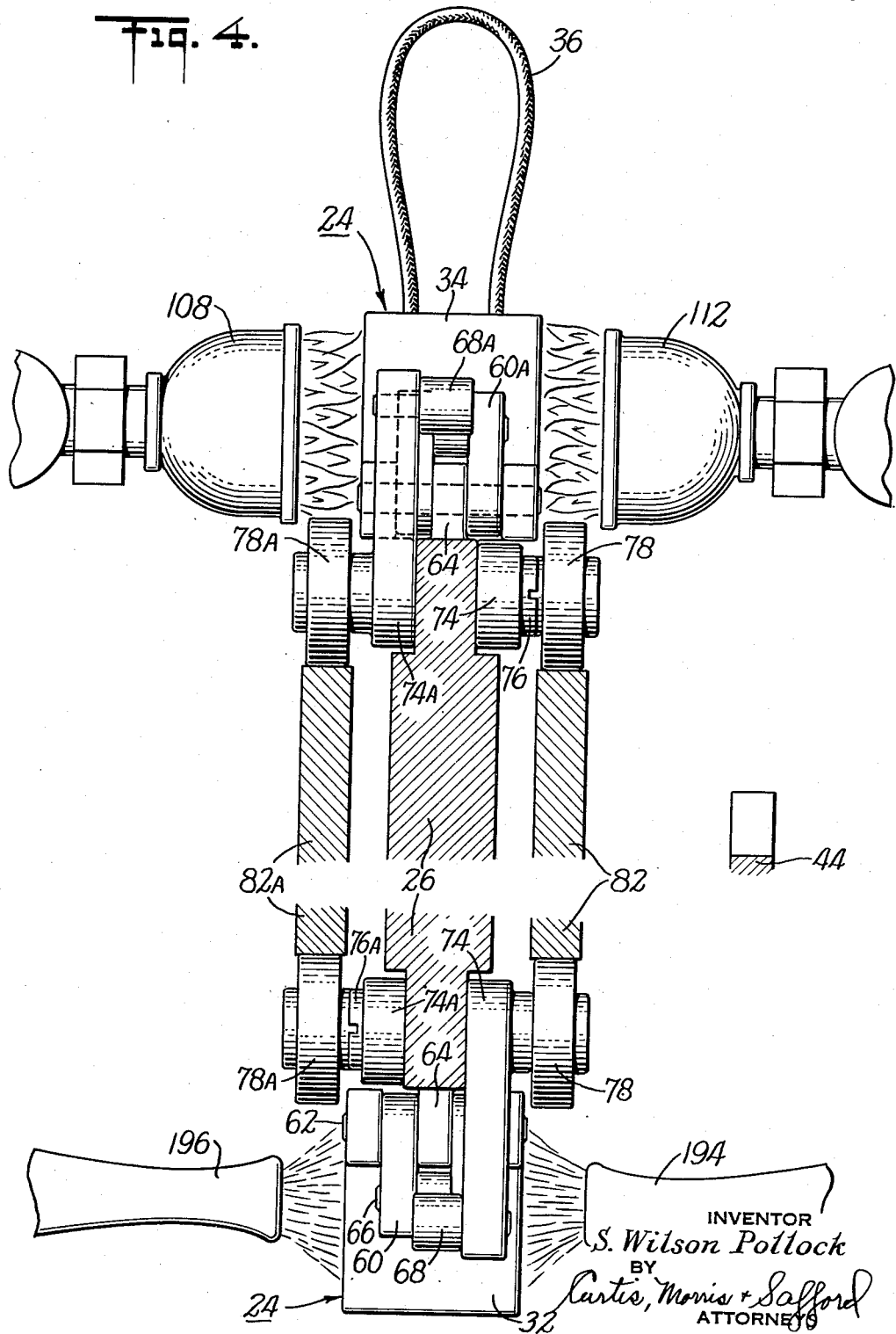

Aug. 10, 1954  S. W. POLLOCK  2,685,708
MOLDING METHOD
Filed Jan. 29, 1951  9 Sheets-Sheet 5
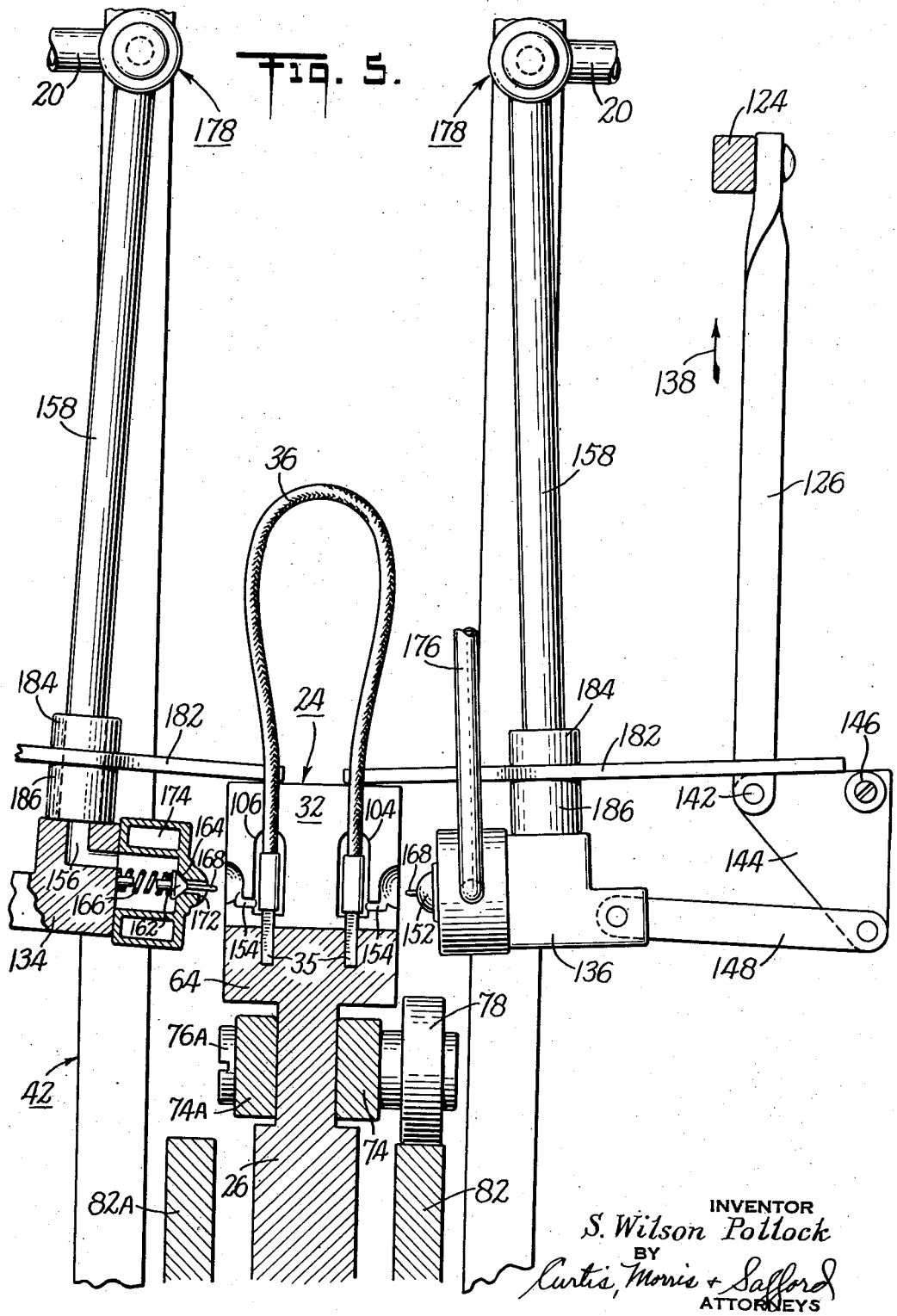
INVENTOR
S. Wilson Pollock
BY
Curtis, Morris & Safford
ATTORNEYS

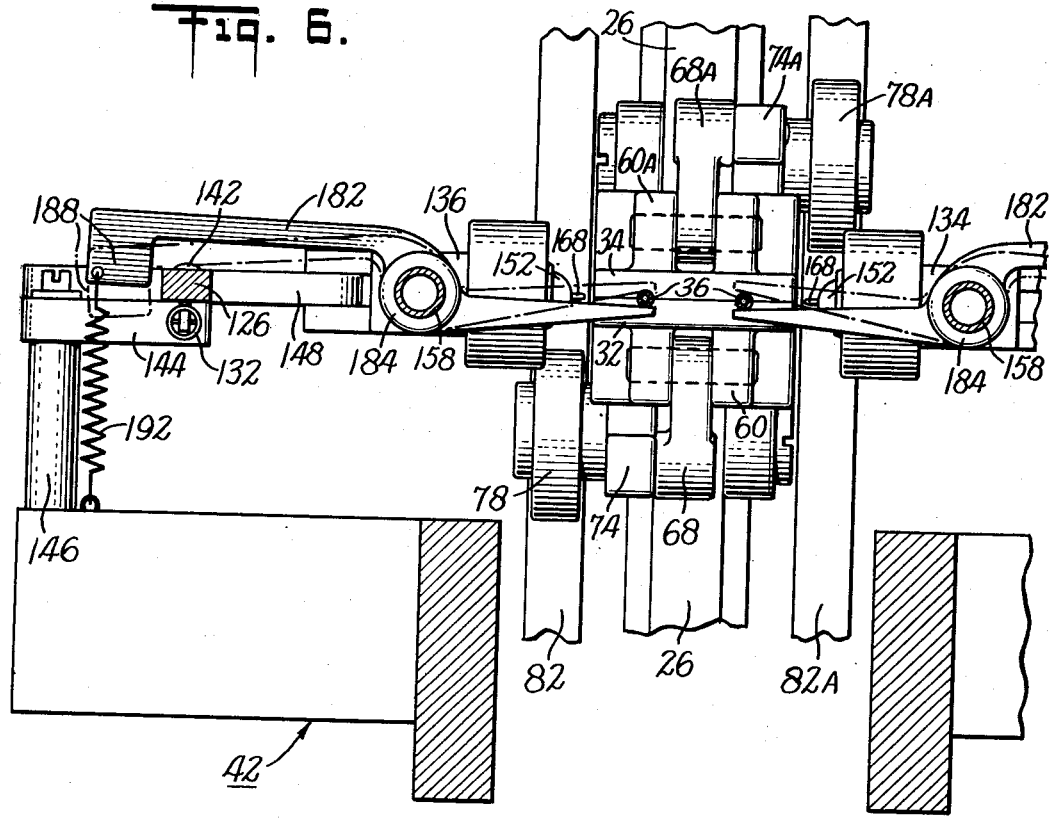

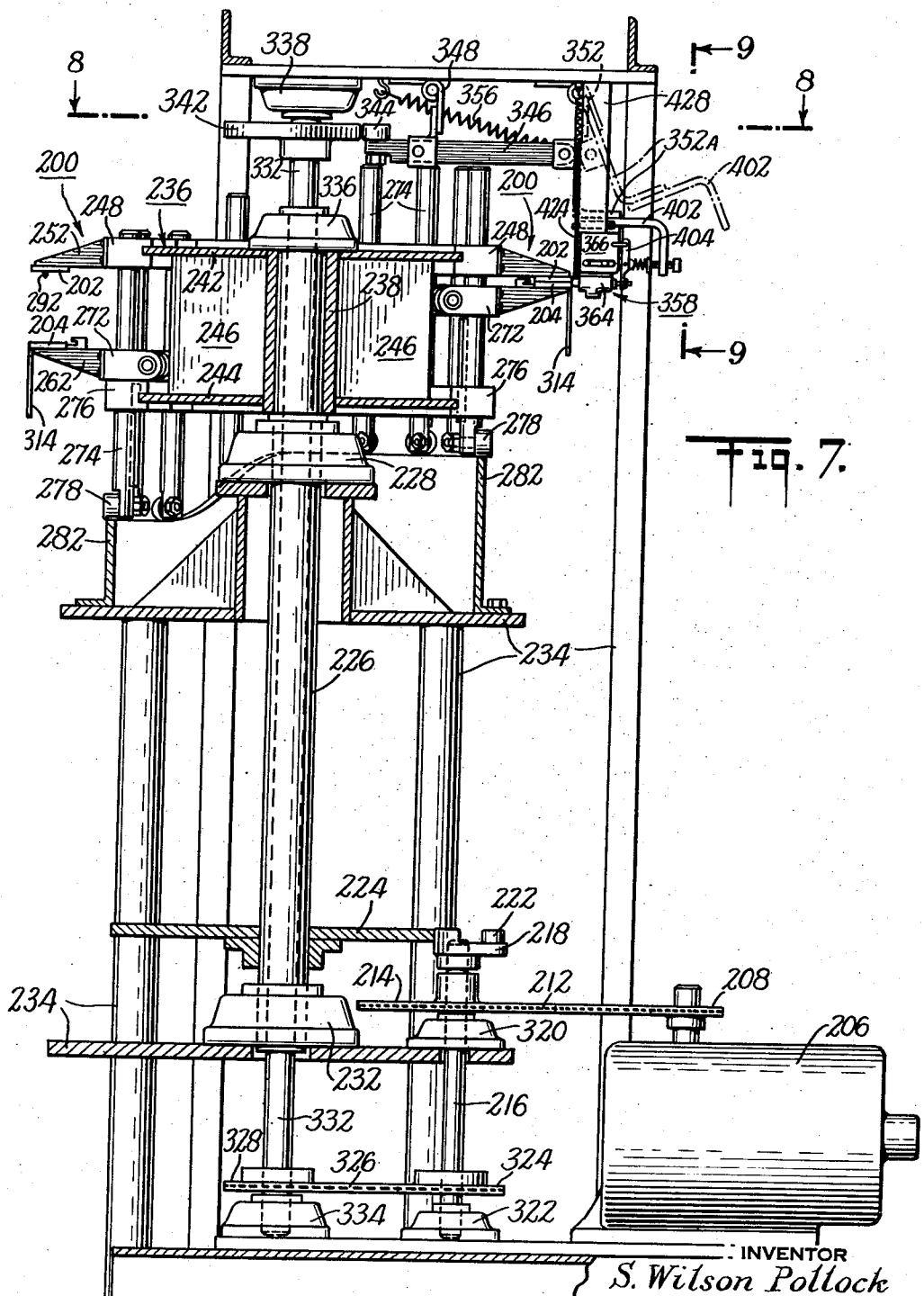

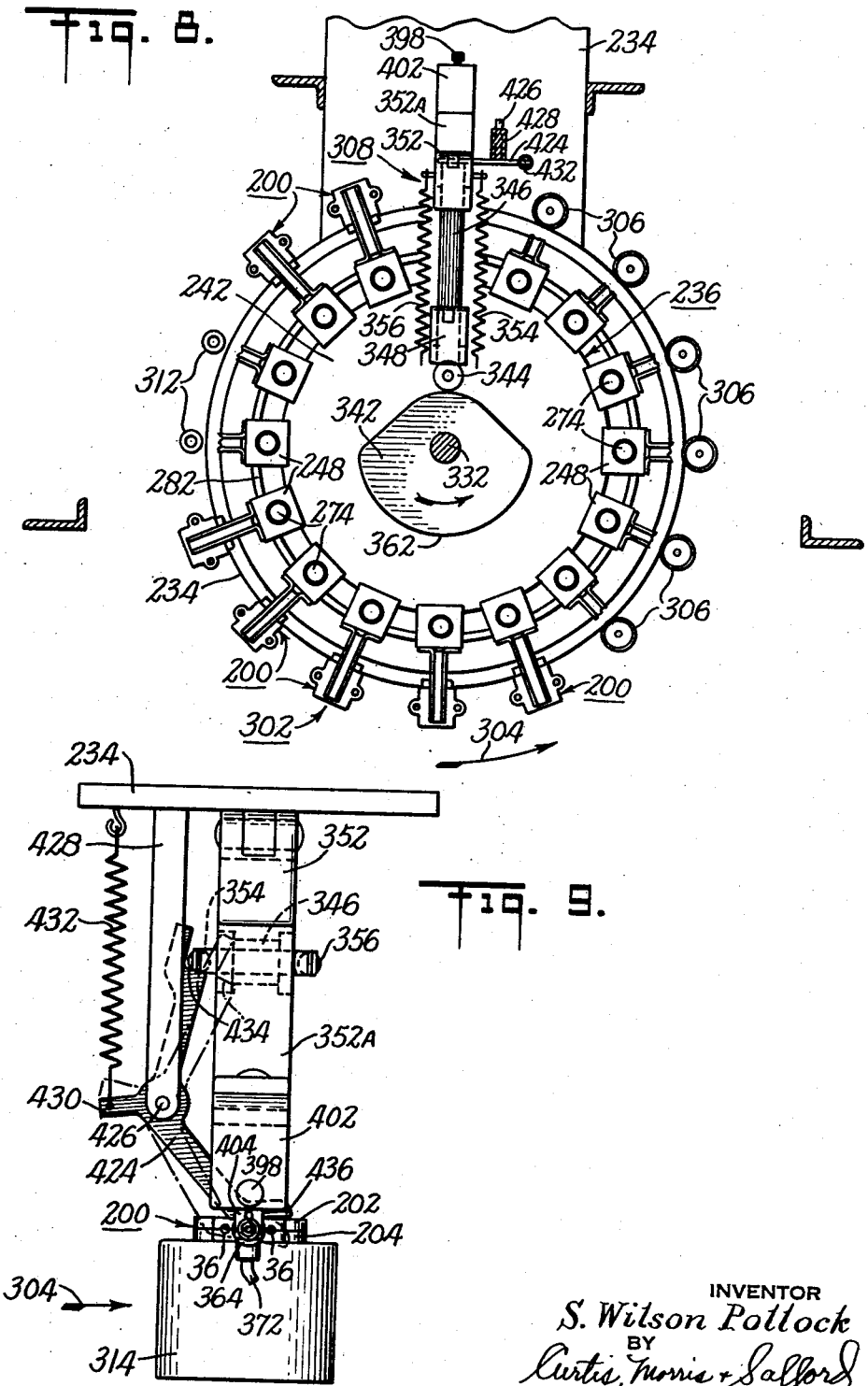

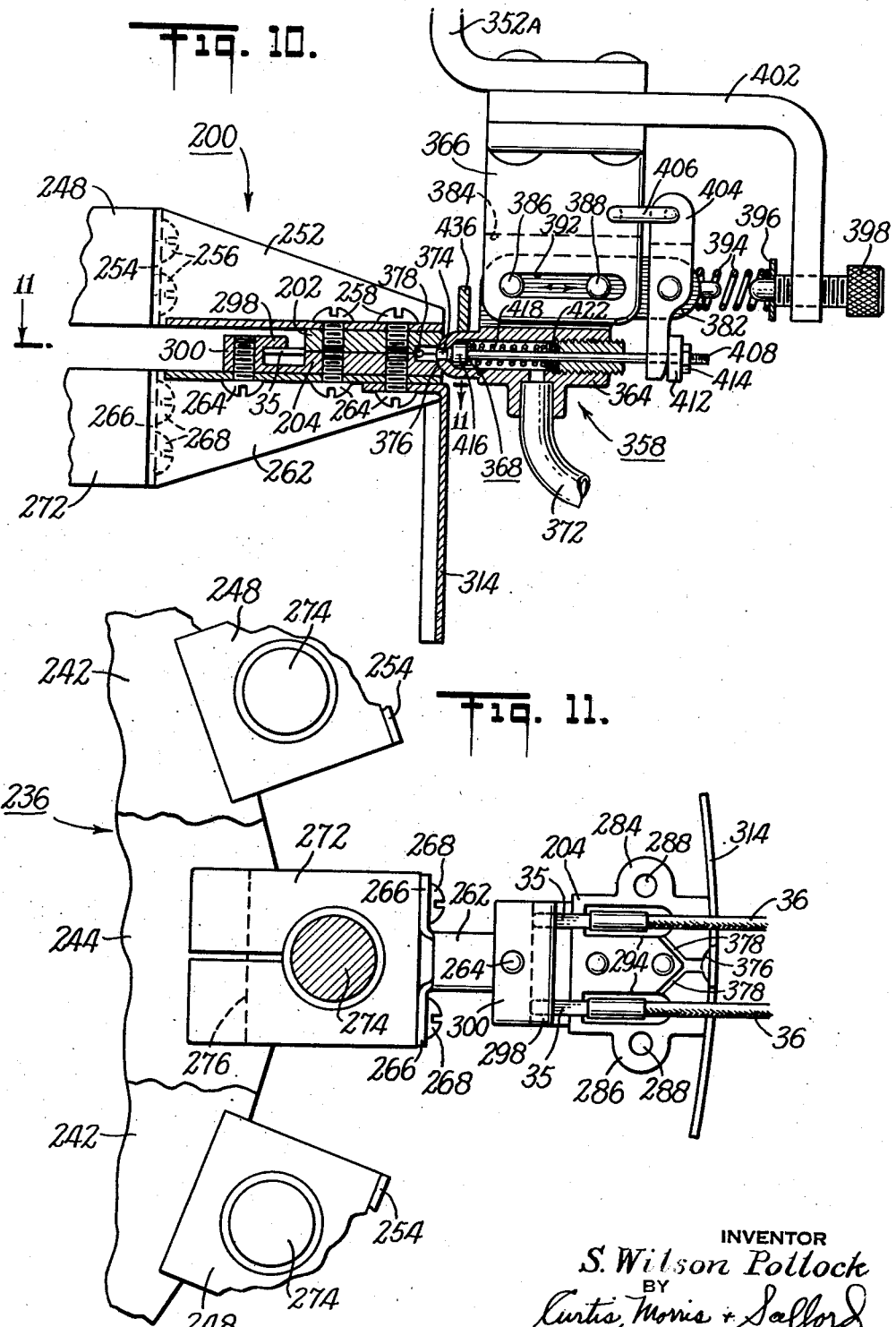

Patented Aug. 10, 1954

2,685,708

UNITED STATES PATENT OFFICE 2,685,708

MOLDING METHOD

Samuel Wilson Pollock, Camp Hill, Pa., assignor to Aircraft-Marine Products, Inc., Harrisburg, Pa.

Application January 29, 1951, Serial No. 208,312

6 Claims. (Cl. 18—55)

This invention relates to methods of molding plastic objects. It is described particularly as embodied in a system for forming a resilient insulating sheath around the ferrule portion of an electrical connector.

In the usual injection molding system, the plastic is heated and forced under very high pressure, for example 15,000 pounds per square inch, into the mold cavities. The molds are opened after the injected plastic has cooled to below its softening temperature.

Such high pressure injection molding necessarily requires very strong precision-made molds or dies. Also, the injection machine itself must necessarily employ very heavy construction to withstand the forces created by such high pressure on the plastic material. In order to obtain a reasonable degree of operating economy, the mold usually consists of numerous cavities so that for one cycle of operation of the machine a multiplicity of identical parts are produced. Where a molding is being made around an insert, it is necessary to properly place the insert in each mold cavity before the molding operation commences. Similarly it is necessary to manually remove each molding with its attendant insert from each cavity before reloading the cavities for the next molding cycle. When numerous cavities are incorporated in one mold (the number of cavities may vary from one to many dozen) an appreciable amount of time is required for the manual insertion of inserts and the manual removal of the finished molded parts. During these operations, the molding machine is necessarily standing idle. This idle time becomes quite costly considering the investment necessary in such a molding machine and its attendant mold or die.

In accordance with the present invention, these and other disadvantages of the molding systems heretofore in use are overcome. In the embodiments of the invention described herein, the resin or plastic is injected into the mold at low pressure, for example 30 to 40 pounds per square inch, so that the molds can be manufactured with less precision and bulk than is required in the usual injection molding system. In order to utilize such low pressure, finely divided discrete particles of resin or plastic, for example, a vinyl resin (such as is sold by Goodrich Rubber Company under the trade-mark Geon), are dispersed in a plasticizer, such as dioctyl phthalate, and used to form the molded product. The plastic particles are not soluble in the plasticizer at room temperatures, but they are soluble in or combine with the plasticizer at higher temperatures to form a solid resilient gel. Preservatives such as lead phosphite may be added to retard deterioration caused by heat and light. This plastic composition may have a viscosity at room temperature similar to that of heavy cream so that it flows readily under the low pressures used in the system. The molds are pre-heated and the plastic sol is injected at room temperature with just sufficient pressure to fill the mold. The plastic is heat-curable so that any leaks between the mold surfaces tend to seal themselves as the plastic which leaves the mold cavities into these interstices is immediately set by the hot surfaces of the mold. The molds are then cooled and the articles removed.

In the illustrated apparatus, multiple molds each having only one or two cavities are moved in step-by-step fashion along an endless path. An operator at one position on the path places the inserts, if such are required, in each mold as it passes by, so that the operator's time is used efficiently and the molding machine is in continual operation.

In the electrical industry, it is frequently desirable to insulate the ferrule portion of an electrical connector after it has been crimped or otherwise secured to an electrical conductor. The system described herein is particularly adapted for molding such insulating plastic around the base of the connector after it is joined to the electrical conductor, but it is to be understood that the invention is not to be limited to this particular application.

Other objects, aspects, and advantages of the invention will be apparent from and in part pointed out in the following description considered in conjunction with the accompanying drawings, in which:

Figure 4 is an enlarged sectional view taken along line 4—4 of Figure 2, the center portion being omitted to permit an enlarged showing of the heating of the molds in the upper portion of the drawing and the forced cooling of the molds in the lower part of the drawing;

Figure 5 is an enlarged partial sectional view taken along line 5—5 of Figure 2 showing the mold-filling station;

Figure 6 is an enlarged partial view taken along line 6—6 of Figure 2 showing the mold filling station;

Figure 7 is an elevational view of a second embodiment of the invention;

Figure 8 is a horizontal sectional view taken along line 8—8 of Figure 7;

Figure 9 is an enlarged view taken along line 9—9 of Figure 7 showing an interlock to prevent injection of the plastic molds that have not been provided with crimped connector inserts;

Figure 10 is an enlarged partial sectional view showing details of the nozzle and control assembly for injecting plastic into the mold; and Figure 11 is a partial sectional view taken along line 11—11 of Figure 10.

Figure 1:
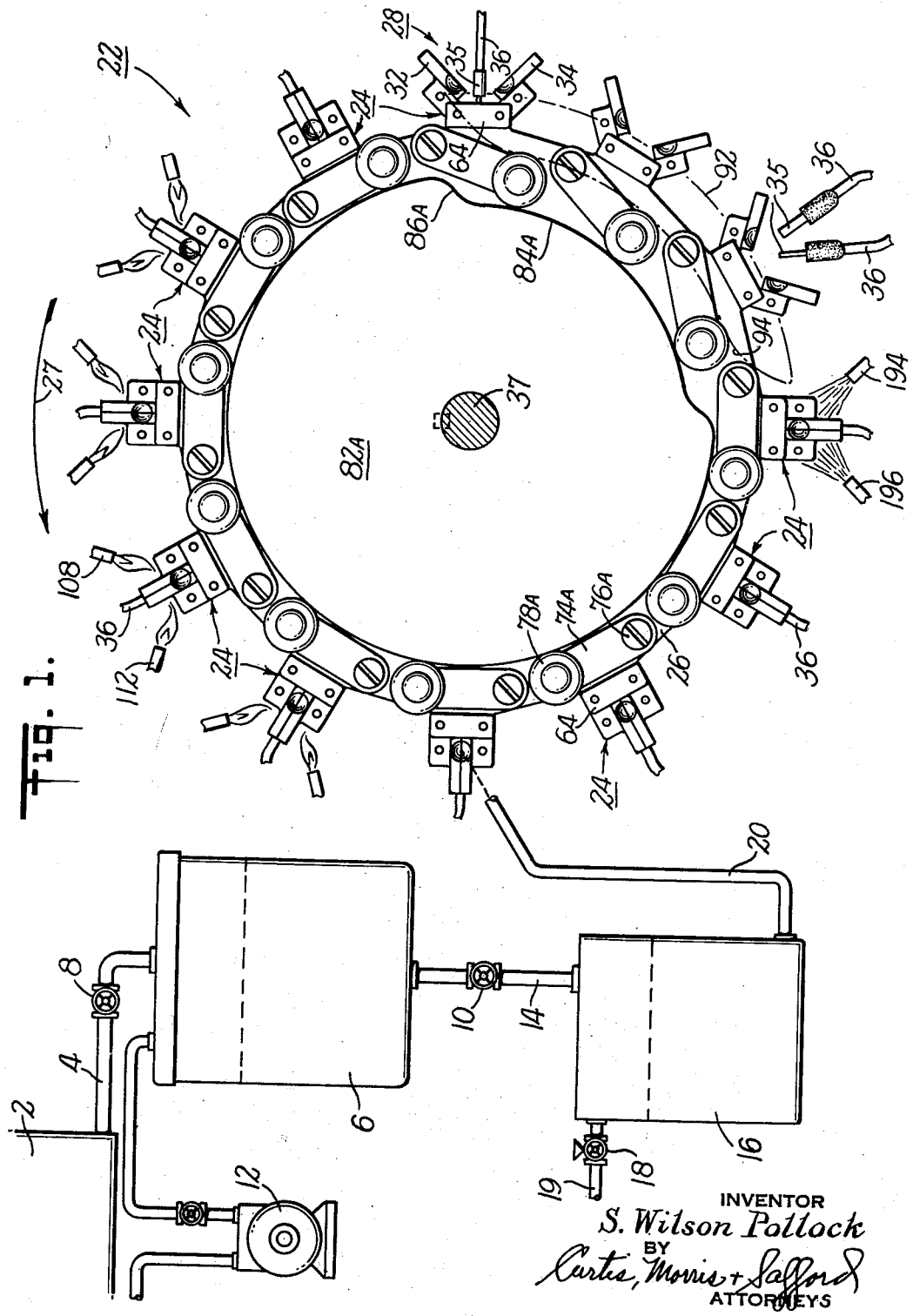
Figure 1 shows, diagrammatically, apparatus for molding insulation around crimped terminals in accordance with the present invention.

Figure 1 illustrates diagrammatically the various steps in the process. The vinyl resin dispersion (described above) flows from a storage tank 2 through a pipe 4 into a vacuum chamber 6, which is provided with an inlet valve 8 and an outlet valve 10. After a sufficient quantity of the dispersed plastic has been transferred to the vacuum chamber 6, the valves 8 and 10 are closed and the pressure in this chamber is reduced by means of a vacuum pump 12. The vacuum is maintained in the chamber 6 for a sufficient period of time to remove air bubbles and trapped gases from the plastic dispersion. The removal of this gas is important in order to prevent the formation of voids or cavities in the molded articles.

After this operation, the dispersed plastic is transferred through a pipe 14 to a pressure tank 16. The valve 10 is then closed so that the next batch of dispersed plastic can be freed from occluded gas while the material in the supply tank 16 is being utilized. A regulator valve 18 in a compressed air supply line 19 is arranged to maintain the material in the tank 16 under just sufficient pressure to fill the molds. This pressure typically is of the order of 30 to 40 pounds per square inch. The injection pressure will depend upon the viscosity of the plastic dispersion, which preferably is adjusted so that the maximum molding pressure will not exceed 100 pounds per square inch. Higher pressures will require greater precision in the manufacture of the molds, thus, increasing the cost.

The dispersed plastic from supply tank 16 flows through a pipe 20 to a molding machine, generally and diagrammatically indicated at 22. This molding machine comprises twelve individual molds, generally indicated at 24, which are positioned around the periphery of a rotatably mounted supporting plate 26. This plate 26 is rotated, in the direction indicated by the arrow 27, with a step-by-step movement, each step being one-twelfth of a revolution, so that each mold advances one step, remains at that station a short period of time, advances an additional one-twelfth revolution, and so on around its circular path.

At the loading station, generally indicated at 28, the jaws 32 and 34 of the mold in this position are separated as shown, and the inserts, which in this example are two plug type connectors 35 crimped to opposite ends of a length of wire 36 are positioned in the mold by inserting the plug tips into suitable openings in the supporting plate 26, as will be described subsequently in greater detail. The supporting plate 26 is then rotated one-twelfth of a revolution to its next station. During this movement of the mold, a cam arrangement, to be described later, closes the jaws 32 and 34.

The mold then successively traverses four heating stations where, as is indicated diagrammatically in Figure 1, the molds are heated. At the next succeeding station, the injection station, the dispersed plastic is injected into the mold cavities at room temperature through suitable orifices.

The heat retained by the mold 24 is sufficient to cure the resin within the cavities, this curing operation occurring during the time the mold traverses the next two stations. At the succeeding station, the mold is cooled, for example, by a water spray or other suitable means. Immersing a portion of the mold in a water bath usually will not cool the molds rapidly enough to permit maximum production speed. As the cooled mold moves to the next succeeding station, the jaws of the mold 24 are opened and the molded article removed. The mold then continues around its circular path, the operation being repeated once for each mold during each revolution.

With this arrangement, the operator's time is used efficiently, one of the molds being positioned for insertion of the connector inserts each time the supporting plate 26 moves one step.

Figure 2:
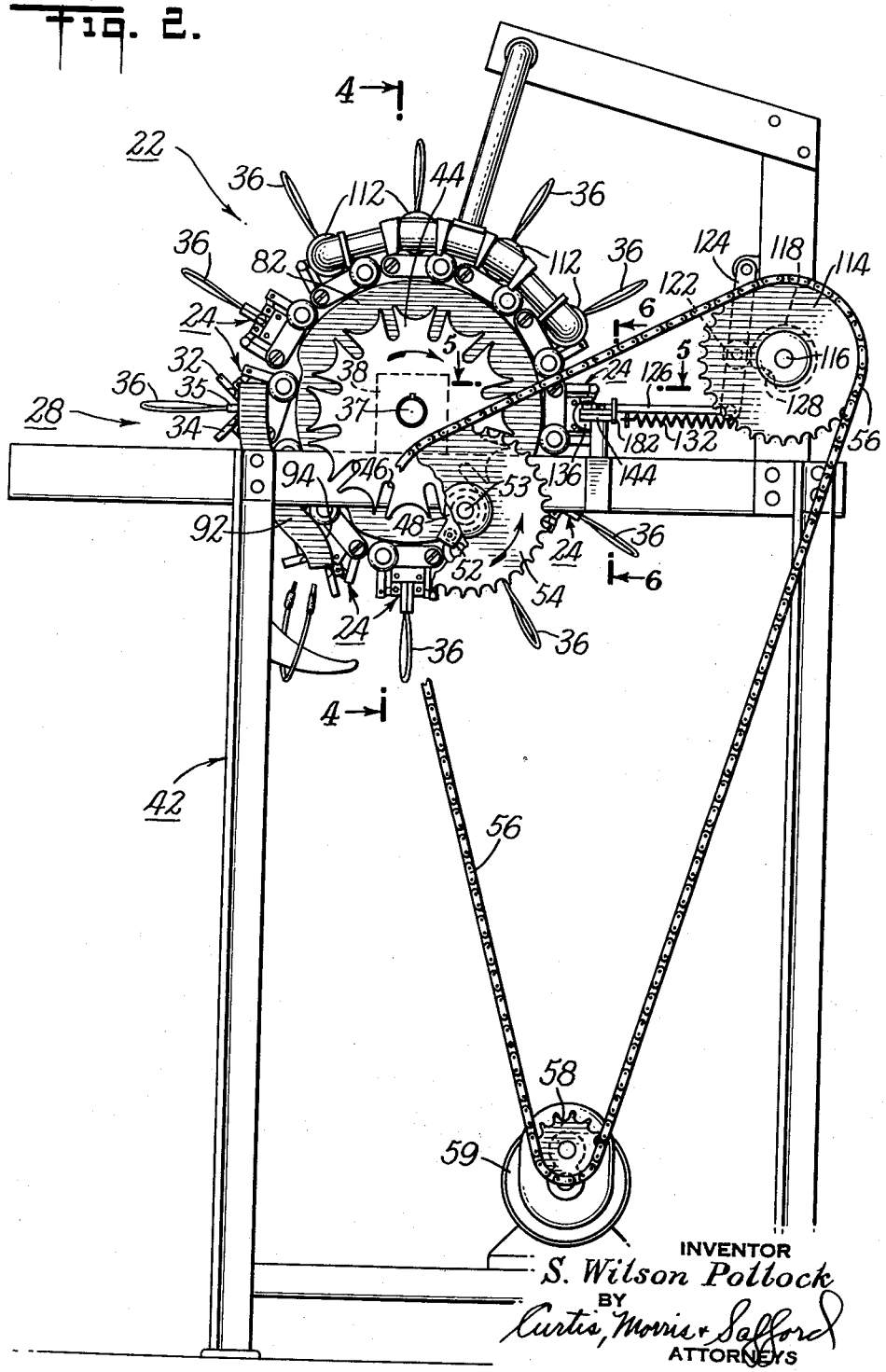
Figure 2 is an elevational view of the molding machine shown in Figure 1.

Figures 2 through 6 illustrate further details of a molding machine suitable for use in the process described in connection with Figure 1. As shown in Figure 2, the supporting plate 26 is secured to and supported by a shaft 37 (Figure 2) which is rotatably mounted between two standards 38 that are supported by any suitable frame such as is indicated generally at 42.

In order to drive the supporting plate 26 with the step-by-step movement, a Geneva drive system is employed comprising a sprocket wheel 44 supported by and keyed to the shaft 37 and having radial drive slots 46. The sprocket 44 is driven by a drive wheel 48 which has a projecting arm 52 that carries a tooth arranged to engage one of the slots 46 during a portion of each revolution of the drive wheel 48.

The drive wheel 48 is supported on a shaft 53 which is connected also to a sprocket wheel 54 that is driven in turn by a chain 56 which engages a sprocket 58 driven, for example, by an electric motor 59.

Figure 3:
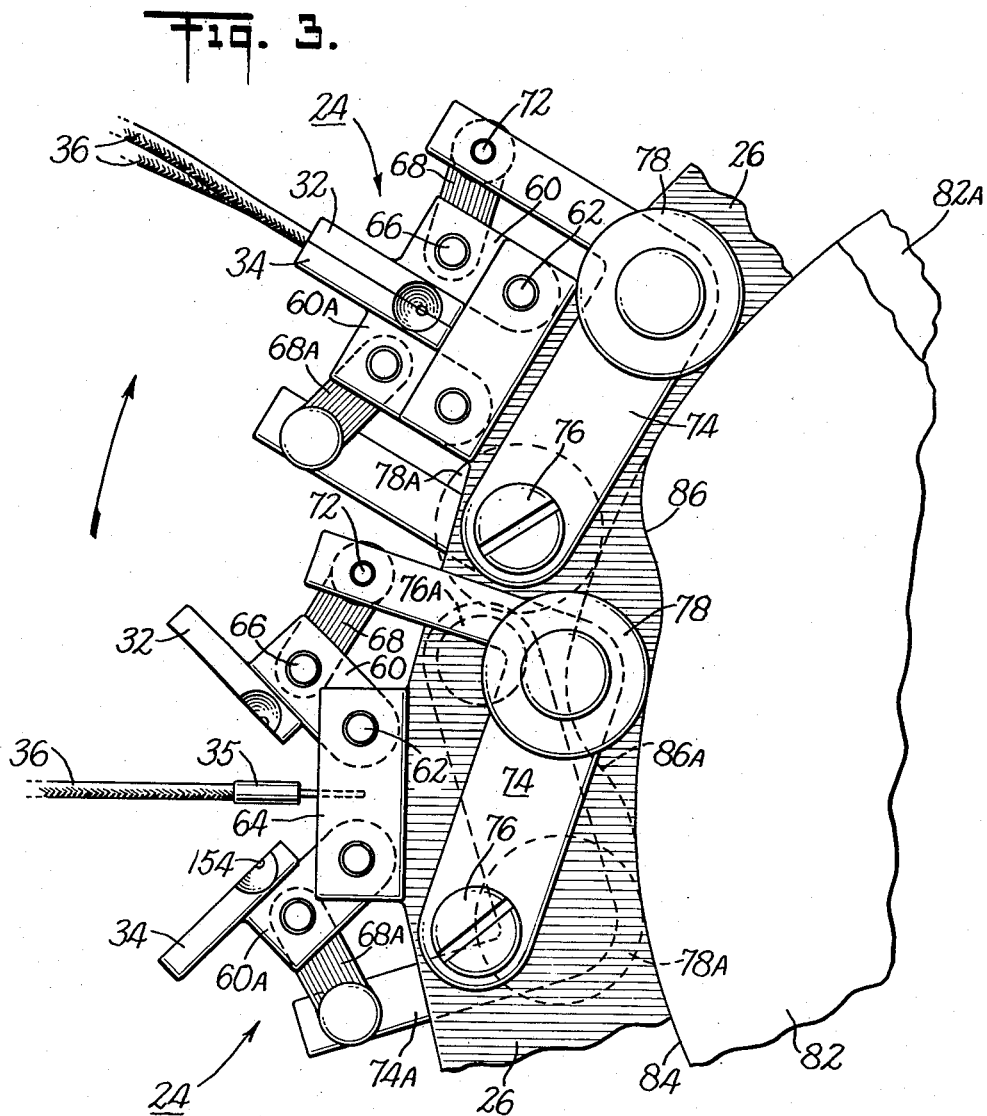
Figure 3 is an enlarged partial elevational view showing the loading station of the molding machine at which the connectors are positioned in the molds.

The arrangement whereby the molds are opened and closed during each revolution of the supporting plate 26 is shown best in Figure 3. Because all of the molds 24 are identical, it is understood that the description of any one mold will apply to all. The mold jaw 32 is supported by means of a projection 60 secured to the outer face of or formed integrally with the mold jaw. The inner end of this projection is pivotally connected by means of a pin 62 to a mold supporting projection 64, cut out to receive the end of the projection 60, that is formed integrally with the supporting plate 26. The mold jaw 32 pivots about the pin 62 when moving between its open and closed positions.

The projection 60 is also pivotally connected, by a pin 66, a link 68 and a pin 72, to one end of an L-shaped bell crank 74. The opposite end of this bell crank 74 is pivotally secured to the side of mold supporting plate 26 by a screw 76. The bell crank 74 carries a rotatably mounted cam roller 78 which rides on the outer cam surface of a stationary mold-operating cam member 82.

The periphery of this cam member 82 is circular except for a dwell, indicated at 84 in Figure 3, the cam being rigidly supported by the frame 42 in concentric relationship to the circular path followed by the molds 24. As best shown in Figure 3, movement of the mold supporting plate 26 in a clockwise direction, so that the mold shown in the loading station is moved to the next succeeding station, causes the cam roller 78 to roll up an incline 86 on the cam member 82, thus moving the mold jaw 32 to its closed position.

The other mold jaw 34 is operated in a substantially identical manner except that its bell crank 74A is pivotally supported on the opposite side of the mold supporting plate 26 and at the opposite end of the mold. The projection 60A is pivotally secured to the projection 64 on the mold supporting plate 26 and is pivotally connected by the link 68A to the end of the bell crank 74A. This bell crank is secured to the opposite side of the mold supporting plate 26 by the screw 76A indicated in dotted outline in Figure 3.

As best shown in Figure 4, the cam roller 78A of the bell crank 74A rides over the outer cam surface of a second cam plate 82A positioned on the opposite side of the mold supporting plate 26 where it is rigidly supported by the frame structure 42.

Because the cam roller 78 is on the leading portion of the mold, whereas the cam roller 78A is on the trailing portion of the mold, the dwells in the cam plates 82 and 82A are angularly displaced so that the two mold jaws 32 and 34 are moved from open to closed positions simultaneously. Thus, as the cam roller 78 is moving up the incline 86 on the cam member 82, the cam roller 78A is moving up the incline 86A, indicated in dotted outline in Figure 3, of the cam member 82A.

In order to force the cam roller 78 to follow the contour of the cam member 82 as the molds approach the dwell 84, a guide member 92, shown in Figure 2, is supported by the frame 42 opposite the dwell 84. Guide member 92 is provided with a tapered surface 94 near one end and an inner arcuate surface which is spaced from the surface of the cam member 82 so that the cam roller 78 rides along the inner surface of the guide member 92 being thereby forced into the dwell 84 to open the molds 24 before they reach the loading station 28. A similar guide member (not shown) is provided adjacent the cam member 82A and is similarly positioned to cooperate with the cam rollers 78A, this latter guide member being angularly displaced in accordance with the displacement of the dwells in the cam plate 82.

At the loading station, the tips of the two connectors 35 (best shown in Figure 5, although this drawing represents the injection or mold-filling station) are inserted into spaced openings in the outer surface of one of the projections 64 on the mold supporting plate 26. These holes form a snug fit with the tips of the connectors 35 and are drilled to such depth that when the connector tips reach the bottom of the holes, the ferrule portions of the connectors 35, which in this example are crimped to opposite ends of the electrical conductor 36, will be positioned correctly within the mold cavities 104 and 106.

As the mold leaves the loading station, the jaws are closed, as shown in Figure 2, and the mold then traverses, step-by-step, the four mold pre-heating stations. At each of these stations, the mold is heated for example by means of burners 108 and 112 (Figure 4) positioned on opposite sides of the mold. Immediately after leaving the last pre-heating station, the mold advances to the injection station where it is filled with the dispersed plastic.

The operation of the injection station will be best understood by an examination of Figures 2, 5, and 6. In order to actuate the injection apparatus, a sprocket 114 (Figure 2) rotatably mounted on the frame 42 is driven, by the sprocket chain 56, through one revolution each time the molds 24 advance one station. This sprocket 114 drives, through a shaft 116, a pair of cams, indicated in broken lines at 118 in Figure 2. A pair of cam rollers 122 are provided which respectively engage the outer surfaces of the cam members 118 and are mounted rotatably on arms 124, which are pivotally supported at one end by the frame 42 and at their opposite ends are connected pivotally to two actuating arms 126. As the cams 118 rotate, the cam rollers 122 are forced simultaneously into dwells 128 on the cam members 118 by means of tension springs 132, each of which is connected at one end to one of the arms 126 and at the other end to the frame 42.

Two injection nozzles 134 and 136 (Figure 5) are arranged to be operated by the arms 126, the nozzle 134 injecting the plastic material into the cavity 106 and the other nozzle 136 injecting into the cavity 104.

Because the arrangements by which the arms 126 move the nozzles 134 and 136 into engagement with the molds 24 are the same, only the means for moving the injection nozzle 136 is shown in Figure 5. The arm 126, which is moved longitudinally in the direction of the arrow 138 at the time the nozzle 136 is to engage the mold 24, is connected pivotally by a pin 142 to a triangularly-shaped bell crank 144 that is pivotally connected at 146 to the frame 42 of the machine. The other corner of the bell crank 144 is connected through a pivotally supported link 148 to the base of the nozzle 136. Thus, when the arm 126 is moved in the direction indicated by the arrow 138, the hemispherical surface of a nose piece 152 is forced into contact with a concave nozzle-receiving opening in the side of the mold 24 to which is connected a sprue or gate 154 that connects with the cavity 104.

The interior of the nozzle 136 is connected through a channel 156 (shown in the sectional view of nozzle 134, the nozzles 134 and 136 being identical) to a pipe 158 which is connected to the pipe 20 from the supply tank 16 so that the dispersed resin is continuously applied under pressure to the nozzles 134 and 136.

Because the resin dispersion is fluid, control valves are provided in the injection nozzles. A conical valve member 162 is maintained normally in engagement with a complementary valve seat 164 by a compression spring 166, thus preventing the dispersed resin from flowing through the nozzle opening. A valve-operating rod 168 is connected to the valve member 162 and projects forwardly though the nozzle opening. When the nozzle is pressed against the mold 24, the end of the rod 168 strikes the bottom of the nozzle-receiving cavity compressing the spring 166 and forming an opening between the valve member 162 and the valve seat 164, permitting the dispersed resin to flow through the nozzle opening, along a lateral cut 172 on the hemispherical face of the nozzle, and through the sprue 154 in the mold 24 into the mold cavity. When the nozzle is removed from the mold 24, the spring 166 closes the nozzle valve.

In order to prevent excessive temperature rise of the nozzles 134 and 136 from contact with the hot molds 24, which would cause the plastic to cure within the nozzle, each nozzle is provided with a cooling chamber 174 which surrounds the central cavity of the nozzle. Water, or other suitable cooling medium, is caused to flow continuously through this cavity 174, for example, by tubes 176 which are connected to a suitable supply of coolant (not shown).

In order to permit the necessary movement of the nozzles 134 and 136, the pipes 158 may be connected to the supply pipe 20 through rotating joints, generally indicated at 178, or if desired the necessary deflection may be obtained by the natural resiliency of the pipe 158 if the length of pipe utilized is sufficiently long.

In order to prevent the injection of the plastic sol in the event that a connector has not been positioned within the cavity, a lock member 182 is provided which is pivotally supported on the pipe 158 between the two collars 184 and 186 (see also Figure 6). One end of the lock member 182 is provided with a downwardly extending flange 188 which is connected to the frame 42 of the machine through a tension spring 192 which urges the outer end of the lock member 182 downwardly. As the mold 24 moves into position at the injection station, the electrical conductor 36 which extends from the mold 24 strikes the inner end of the lock member 182 at a point adjacent the mold 24, moving the end of the lock member 182 downwardly, that is rotating it about the pipe 158 to lift the flange 188 of the lock member 182 above the level of the triangular bell crank 144.

If, however, no electrical conductor extends from the mold cavity, the flange 188 is not lifted and remains in position to prevent any rotary movement of the bell crank 144 so that the nozzle 136 is prevented from engaging the mold 24. An identical arrangement is provided for the nozzle 134.

After the mold cavities have been filled, the mold passes successively through the next two stations allowing sufficient time for the plastic to cure by the transfer of heat from the mold. At the next station, the mold is cooled by a spray of water, or other suitable coolant, from nozzles 194 and 196 (Figure 4).

In the embodiment of the invention just described, the molds are arranged to move along a circular path lying in a substantially vertical plane. In the embodiment shown in Figures 7 to 11, the molds, generally indicated at 200, are arranged to move along a path lying in a substantially horizontal plane.

As shown in Figure 7, the jaws 202 and 204 of these molds are separated by vertical movement of the jaws 204, the jaws 202 remaining in the same horizontal plane throughout the molding operation.

In order to move the molds 200 with the desired step-by-step movement, an electric motor 206 drives a sprocket wheel 208 that is connected by a chain 212 to a larger sprocket 214 mounted on a vertical drive shaft 216. An arm 218, which carries a roller 222, is connected to the drive shaft 216 and forms part of a Geneva drive movement including a large sprocket wheel 224, similar to the sprocket wheel 44 previously described in connection with Figure 2. This drive system provides intermittent movement of a tubular drive shaft 226 to which the hub of the sprocket wheel 224 is secured. The vertical drive shaft 226 is supported for rotary movement by two bearings 228 and 232 rigidly supported by a frame 234.

The portion of drive shaft 226 near its upper end, and above the bearing 228, is arranged to drive a mold supporting structure, generally indicated at 236, comprising a central sleeve 238 that is secured to the drive shaft 226. An upper annular mold-supporting plate 242 is secured to the upper end of the sleeve 238, and a lower annular guide-supporting plate 244 secured to the sleeve 238 near its lower end. These two mold supporting plates 242 and 244 are connected by vertically extending ribs 246 that reinforce the two mold supporting plates and maintain them in vertical alignment. The structure 236 supports the sixteen molds 200 at equally spaced positions around a circular path. The molds and mold operating structures being identical, it will be understood that what is said about one of the molds and its operating structure applies equally well to the others.

A series of jaw-supporting blocks 248 are secured at spaced intervals to the outer portion of the upper mold-supporting plate 242. To each of these jaw-supporting blocks 248 is secured a tapered channel bracket 252 which is provided at its base with flanges 254 (see also Figure 10) which are connected by screws 256 to the outer surface of the associated jaw-supporting block 248. As best shown in Figure 10, the bracket 252 supports the upper mold jaw 202 by means of screws 258 extending downwardly through the bracket 252 in threaded engagement with the mold jaw 202.

The lower mold jaws 204 are each supported by a tapered channel bracket 262 (Figure 10), similar to the upper bracket 252, by screws 264 which extend upwardly through the bracket 262 into threaded engagement with the lower mold jaw 204. At its base (Figure 11), the bracket 262 is provided with flanges 266 which are secured by screws 268 to the outer face of a lower mold-supporting block 272 that is releasably clamped to a vertically movable mold-actuating shaft 274. The shaft 274 is slidably mounted in a bearing block 276 (Figure 7) secured to the outer portion of the lower supporting plate 244. The shaft 274 extends also through a vertical bore in the upper jaw-supporting block 248 which, thus, serves also as a bearing for the shaft 274 which moves vertically to bring the lower jaw 204 into or out of engagement with the upper jaw 202.

At its lower end, the shaft 274 carries a cam roller 278 that rests on the upper edge of a drumlike cylindrical cam member 282 that is rigidly supported by the frame 234.

The upper edge of the drum 282 is provided with gradual inclines that form a cam surface by which the shaft 274 is moved between an upper and a lower position, to open and close the mold jaws 202 and 204, as the cam roller 278 traverses the upper edge of the drum 282.

Thus, as the Geneva drive system rotates the mold supporting structure 236, the jaws of the molds 200 are alternately open and closed at predetermined positions along their circular path.

In order to insure precision alignment of the mold jaws as they are closed, the lower jaw 204 is provided with oppositely disposed outwardly extending ears 284 and 286 (Figure 11) each of which is provided with an alignment hole 288. Each of the upper mold jaws (Figure 7) carries two downwardly extending tapered alignment pins 292 that are positioned to engage the holes 288 to insure correct alignment of the jaws 202 and 204 as they are being closed.

In order to maintain the connectors 35 in their correct position in the mold cavities 294 during the molding operation, the connectors are positioned, at the loading station, in the cavities of the lower mold jaws (Figures 10 and 11) with their tips resting on the upper surface of a groove near the rear of the jaw and extending beneath a forwardly-extending lip 296 of a flange member 300. Thus, one portion of the plug tip of the connector 35 lies on the upper surface of a groove in the mold jaw adjacent the cavity 294 and another portion of the tip is positioned against the under-surface of the flange member 298. Other forms and types of supports can be provided readily depending upon the shape and size of the inserts to be placed in the molds.

In this example, sixteen identical molds are provided in the illustrated apparatus, but the steps of the process by which the molded articles are fabricated are substantially identical with those described in connection with Figures 1 to 6.

As is illustrated best by Figure 8, the connector inserts 35 are positioned in the lower mold jaws 204 at a loading station, generally indicated at 302, the mold jaws then are closed, by the upward movement of the shaft 274 as it traverses an inclined portion of the upper edge of the cylindrical cam member 282, while the mold traverses the next two stations in the direction indicated by the arrow 304 in Figure 8. At the succeeding six stations, gas burners 306 are positioned to apply heat to the surface of the mold. These burners are arranged to heat the molds 260 to a temperature in excess of that required to cure the particular plastic material being used. At the next station, the injection or mold-filling station, generally indicated at 308, the heated mold is filled with the liquid plastic material.

The next two stations allow sufficient time for the plastic in the mold to be cured by the transfer of heat from the mold to the plastic. At the next two stations, water from nozzles, diagrammatically indicated at 312, is sprayed against the surface of the mold to cool it. The mold is then opened, by the cam arrangement described above, as it moves toward the loading station 302. The finished insulated connectors may be removed by hand or by any suitable automatic arrangement.

In order to prevent the heat from the burners 306 from reaching the conductors 36, which extend outwardly from the molds, a shield 314 (best shown in Figures 10 and 11) is secured to the under-surface of each of the lower mold jaws 204, for example by one of the screws 264, and extends downwardly substantially in alignment with the outer surface of the mold.

The operation of the plastic injection apparatus can be best explained in connection with Figures 7, 8, and 10. As shown in Figure 7, the drive shaft 216, which is supported in conventional bearings 320 and 322, carries a lower sprocket 324 connected by a chain 326 to a similar sprocket 328 that is keyed to a vertical drive shaft 332. This drive shaft 332 is supported by a lower bearing 334 and extends upwardly through the tubular drive shaft 226 and is supported at its upper end by bearing 336 which is secured by any suitable means to the mold supporting structure 236. The shaft 332 carries near its upper end a cam member 342 the shape of which is best shown in Figure 8. The drive mechanism just described is arranged to rotate this cam member 342 one revolution each time the molds are advanced one station. A bearing 338 locates the uppermost part of frame 234 in definite relation to shaft 332.

A cam roller 344 engages the outer edge of the cam member 342 and is rotatably supported at the end of a nozzle actuating rod 346 (see also Figure 7). The rod 346 is supported by two hangers 348 and 352 which are hinged at one end to the frame 234 and at the other are pivotally connected to the rod 346, thus permitting the rod 346 to be moved endwise as the roller 344 follows the edge surface of the cam member 342. The cam roller 344 is maintained normally in engagement with the surface of the cam 342 by two tension springs 354 and 356 which extend from one end of the rod 346 to the frame 234.

The hanger 352 is provided with a downwardly extending L-shaped portion 352A that supports the injection nozzle assembly, generally indicated at 358, and shown most clearly in Figure 10. When the cam roller 344 is engaged with the widest part of the cam member 342, as indicated at 362 in Figure 8, the bracket 352A is in the position indicated in broken lines in Figure 7. When a heated mold has been positioned at the injection station, the cam roller engages the opposite narrower side of the cam member 342, thus moving the bracket 352A to the position shown in solid lines in Figures 7 and 10. In this position a nozzle 364, which is carried by a bracket 366 extending downwardly from the L-shaped bracket portion 352A, engages the outer surface of the mold. A nozzle valve, generally indicated at 368 within the nozzle 364, is then actuated by a mechanism to be described presently and permits the plastic dispersion, which is delivered to the nozzle 364 by a flexible tube 372, to pass through an orifice 374 in the nozzle 364 into the mold.

As shown in Figure 11, the mold is provided with a hemispherical nozzle receiving opening 376 that is connected by sprues or gates 378 to the mold cavities 294. It will be noted that in this embodiment, a single nozzle is utilized for injecting the dispersed plastic into both cavities.

In order to support the nozzle 364 in the bracket 366 and provide for the operation of the cut-off valve 368, a flat supporting member 382, preferably formed integrally with the nozzle 364 and extending upwardly therefrom, is positioned slidably in a slot 384 in the lower end of the bracket 366. Two motion-limiting pins 386 and 388 are secured to the slidable supporting member 382 and extend into a slot 392 in the bracket 366.

The slidable nozzle-supporting member 382 is biased toward its forward position by a compression spring 394 extending between the rearward portion of the slidable member 382, which extends beyond the bracket 366, and a washer 396 that is carried by an adjustment screw 398 in threaded engagement with an L-shaped arm 402 extending rearwardly and downwardly from the bracket portion 352A.

A valve operating lever 404 is pivoted near its center on the nozzle supporting member 382 and is connected by a wire link 406 to the bracket 366, the wire link 406 pivotally engaging the bracket 366 at one end and the lever 404 at the opposite end. The lower end of the lever 404 is forked and straddles a valve actuating rod 408. A washer 412, held in position by a nut 414 on the rod 408, engages the rearward face of the lever 404 so that the lever 404 can exert a force on the rod 408 moving it toward the right, as viewed in Figure 10, thus moving a valve member 416 in the forepart of the nozzle 364 away from its valve seat and permitting the plastic to flow into the mold 260. A compression spring 418, surrounding the valve actuating rod 408, normally maintains the valve 368 in closed position. Suitable means, including for example an O-ring 422, are provided to prevent the dispersed plastic from leaking around the rod 408 where it enters the nozzle 364. This nozzle also employs water cooling for reasons explained earlier.

In operation, when the injection assembly 358 is moved toward the left as viewed in Figure 10, the face of the nozzle 364 engages the outer face of the mold 200. The movement of the nozzle 364 is limited by its engagement with the mold, but the bracket 366 continues its movement toward the mold until the end of the slot 392 abuts the limit pin 388. This latter movement of the bracket 366 causes, because of the connecting link 406, rotary motion of the lever 404 in a counter-clockwise direction about the point at which it is pivoted to the member 382, this pivot point remaining stationary because the slide member 382 is rigidly connected to the nozzle 364.

This counter-clockwise movement of the lever 404 causes the valve actuating rod 408 to move toward the left as viewed in Figure 10 opening the nozzle and permitting the plastic sol to enter the mold 200.

As the cam member 342 continues to rotate, the bracket 366 moves in the opposite direction, first to release the valve member 416 closing the injection port and then to remove the nozzle 364 from the mold, so that the mold just filled moves to the next station at which the curing takes place, and the following preheated mold moves into the injection station.

In order to prevent the injection of plastic into the mold when no insert has been positioned in the mold, a lock member 424 (Figures 9 and 10) is provided which prevents the nozzle 364 from moving into engagement with the mold when the conductors 36 are not extending from the end of the mold.

This lock member 422 is pivotally supported at 426 on a frame member 428. An ear 430 on the lock member 424 is connected to one end of a tension spring 432 that extends from the upper portion of the frame 234 and biases the lock member 424 toward the position shown in broken lines in Figure 9. In this position, a notch 434 near the upper end of the lock member 424 is positioned beneath the bar 346 and prevents this bar from moving downwardly. As can be seen from Figure 7, movement of the bar 346 toward the left, to bring the nozzle 364 into engagement with the mold, must necessarily be accompanied by downward movement of the bar 346. The lock member 424 in its normal position prevents this downward movement of the bar 346 and thereby prevents the nozzle 364 from engaging the mold.

However, when a mold is moved into the injection station along the path indicated by the arrow 304 in Figure 9, the conductors 36 extending from the face of the mold engage an arm 436 of the lock member 424 and rotate the lock member in a counter-clockwise direction toward the position shown in solid lines in Figure 9. This movement of the lock member 424 moves the notch 434 on the upper portion of the member from its position beneath the bar 346, allowing the nozzle to be moved to engagement with the mold. When the hemispherical nose piece of the nozzle 364 strikes the lower edge of the arm 436, it cams the arm 436 upwardly out of the path of the injection nozzle.

It is thus seen that the two embodiments of the invention described herein are well adapted to attain the ends and objects hereinbefore set forth and that they can be readily fabricated by conventional manufacturing techniques and that they are suitable for continuous and efficient operation.

It will be readily appreciated that various features of the invention can be used to advantage without a corresponding use of other features, and that various modifications of the embodiments described herein may be made in accordance with the particular use to which the invention is to be put without departing from the scope of the invention as set forth in the following claims. Moreover, it is apparent that the apparatus described herein is not limited to the use of any particular resin or plastic material but may be utilized with various molding compositions.

What is claimed is:

1. The method of forming a molded plastic article from a casting composition that is liquid at the start, but is readily solidified by the application of heat, which method comprises preheating a closed split mold to a temperature sufficient to rapidly solidify the casting composition upon contact therewith, and thereafter, while the mold is still heated to this temperature, injecting the liquid casting composition into the mold under superatmospheric pressure whereby the liquid casting composition is caused to solidify upon contact with the mold, thereby preventing the escape from the mold of excess casting composition, and completely solidifying the casting composition prior to removal from the mold.

2. The method defined in claim 1 further characterized in that the liquid casting composition is subjected to reduced atmospheric pressure before use for a sufficient length of time to remove entrapped gases therefrom.

3. The method as defined in claim 1 further characterized in that the pressure at which the liquid casting composition is injected into the mold is less than 100 pounds per square inch.

4. The method as defined in claim 1 further characterized in that after the liquid casting composition has been injected into the mold, the mold is cooled by subjecting the outer surface thereof to a cooling medium, and the cured plastic is thereafter removed from the mold.

5. The method as defined in claim 1 applied to a casting composition consisting of a synthetic resin dispersed in a liquid plasticizer.

6. The method as defined in claim 1 applied to a casting composition comprised of a vinyl resin in small, discrete particles, dispersed in a plasticizer that is a liquid and is a non-solvent for said vinyl resin at room temperature.

References Cited in the file of this patent

UNITED STATES PATENTS

| Number | Name | Date |
|---|---|---|
| 2,117,400 | Cobb | May 17, 1938 |
| 2,207,426 | Bailey | July 9, 1940 |
| 2,296,296 | Shaw | Sept. 22, 1942 |
| 2,309,729 | Gordon | Feb. 2, 1943 |
| 2,327,227 | Tucker | Aug. 17, 1943 |
| 2,439,506 | Christian | Apr. 13, 1948 |
| 2,442,607 | Leguillon et al. | June 1, 1948 |
| 2,477,273 | Tognola | July 26, 1949 |
| 2,518,594 | Blanchard et al. | Aug. 15, 1950 |
| 2,526,797 | Ashbaugh | Oct. 24, 1950 |

FOREIGN PATENTS

| Number | Country | Date |
|---|---|---|
| 500,298 | Great Britain | July 28, 1938 |

OTHER REFERENCES

British Plastics, April 1948; article entitled "P. V. C. Paste its Properties and Uses," by D. K. Baird, pages 167–171.